United States Patent [19]
Wendel

[11] 3,975,267
[45] Aug. 17, 1976

[54] LIQUID TREATING SYSTEM

[75] Inventor: Henry H. Wendel, Mexico City, Mexico

[73] Assignee: Henry H. Wendel, Mexico City, Mexico

[22] Filed: July 18, 1975

[21] Appl. No.: 597,017

Related U.S. Application Data

[63] Continuation of Ser. No. 448,542, March 6, 1974, abandoned.

[52] U.S. Cl. ................................................. 210/35
[51] Int. Cl.² .......................................... C02B 1/76
[58] Field of Search .................. 210/30, 32, 35, 37, 210/38

[56] References Cited
UNITED STATES PATENTS

| | | | |
|---|---|---|---|
| 2,891,007 | 6/1959 | Caskey et al. | 210/35 |
| 3,658,470 | 4/1972 | Zievers et al. | 210/37 |
| 3,687,843 | 8/1972 | Emmett | 210/35 |
| 3,691,109 | 9/1972 | Larsen | 210/32 |

*Primary Examiner*—Charles N. Hart
*Assistant Examiner*—Ivars Cintins
*Attorney, Agent, or Firm*—Poms, Smith, Lande & Glenny

[57] ABSTRACT

A method for producing treated liquids by utilizing a treating material such as an ion exchange resin or adsorbent resin, said liquid to be treated being passed through a zone containing said treating material; when said ion treating material is exhausted regenerating said treating material in said zone by passing therethrough a liquid regeneration solution (in a direction opposite the flow of liquid to be treated); said zone having a pressure of at least 10 pounds; and regeneration solution being added in increasingly concentrated amounts in at least two steps and preferably three steps or more.

13 Claims, No Drawings

LIQUID TREATING SYSTEM

This is a continuation of application Ser. No. 448,542, filed Mar. 6, 1974, now abandoned.

BACKGROUND OF THE INVENTION

The removal of impurities from water and other liquids has been a longstanding problem in the art and, more recently, as our society has become more sophisticated and complex this problem of treating water and other liquids to remove impurities therefrom has become even more serious. This particularly is true in the area of removing undesirable anion, cations, and organic contaminants from liquids.

In recent years, it has been the rule to remove undesirable substances from water by contacting the water with an ion-exchange resin or an adsorbent resin. Ion-exchange materials are either cation exchangers or anion exchangers. Exchangers of the cation type normally have exchangeable hydrogen ions and are utilized to remove the cations contained in a liquid by exchanging the hydrogen ions for the cations. When the cation exchanger is exhausted it is regenerated by passing an acid therethrough such as sulfuric or hydrochloric acid.

An anion exchanger contains easily exchangeable anions such as as ammonia or hydroxyl ions and is utilized to remove undesirable anions from the liquid to be treated.

When complete deionization is required the liquid (e.g. water) to be deionized can either be passed through a cation exchange resin and then an anion exchange resin or, in the alternative, the liquid to be deionized may be passed through a so-called mixed bed of ion exchange resins which includes both cation and anion exchange resins. The mixed bed is normally a homogeneous admixture of cation and anion exchange resins.

In addition to the foregoing types of deionization, one may also utilize a so-called stratified bed, which can be either a cation exchange resin bed or an anion exchange resin bed. If they are used in conjunction with each other to provide complete deionization, the liquid to be deionized is passed first through the cation exchange stratified bed and then through the anion exchange stratified bed.

In an anion exchange stratified bed it is normal to have down flow service (i.e. the water to be treated enters the top of the bed and exits from the bottom) with the weak base anion exchange resin being on top and the strong base anion exchange resin being on the bottom so that the water has to contact the weak base anion exchange resin first. The weak base anion exchange resin removes the strong acid ions such as the chloride ion and sulfate ion whereas the strong base anion exchange resin removes silica and carbon dioxide as well as any residual strong acid ions.

When the anion exchange resin is exhausted it is normally regenerated by utilizing alkaline solutions such as sodium hydroxide. If sodium hydroxide is utilized as the regenerating solution or liquid the anion exchange resin will contain easily exchangeable hydroxyl ions.

Adsorbent resins or polymers are materials which are useful in treating liquids such as water by removing organic contaminants (e.g. phenols) contained therein by a process known as adsorption. When the liquid containing the organic contaminants is passed through the adsorbent material (which is normally in granular or bead form) the organic material is adsorbed through the surface of the resin.

Adsorbent resins may be regenerated, i.e. the adsorbed material may be removed from the adsorbent resin and the resin used again, by a variety of regeneration liquids. For example, various polar organic solvents can be used as regeneration liquids. In order to be satisfactory the regeneration liquid should be a good solvent for the adsorbed material as well as interacting with the surface of the adsorbent resin. In general, methanol is an excellent regeneration liquid.

If potentially ionic materials are being adsorbed then an alkaline liquid (e.g. an aqueous solution of sodium hydroxide) can be used when the adsorbed material is acidic and when the adsorbed material is basic then an aqueous solution of acid may be used. It should be noted that regeneration solutions or liquids for adsorbent resins are known in the art and therefore no detailed exemplification thereof will be given since the present invention is not predicated on the use of these regenerants.

Prior art systems for treating liquids such as water utilizing treating material such as ion exchange resins, although being relatively efficient, do have a number of disadvantages. For example, the life of the ion exchange resins is relatively short and the efficiency of the regenerating solution necessary to regenerate the exhausted ion exchange resins is only 60% to 80% thereby using excess regeneration solution and making the purification system very expensive. Moreover, the resin capacity is not great (particularly after the resins have been in use for any period of time) and the quality of the water is often not good, particularly if the flow rate is sufficiently high to be practical.

From the foregoing it is apparent that it is desideratum in the art to embody a liquid treating system wherein water or other liquids can be purified and treated easily, rapidly and efficiently by maintaining high quality water for extended periods of time and at rapid flow rates and, at the same time, provide long resin life and fast and inexpensive regeneration of the exhausted resins.

SUMMARY OF THE INVENTION

The primary object of the present invention, therefore, is to provide a purification and demineralizing system for liquids containing dissolved ions and non-ionic organic contaminants or substances which is efficient and inexpensive.

Another object of the present invention is to provide and embody a method for treating water whereby the quality of the water is maintained for long periods of time.

A further object of the present invention is to disclose and embody a water treating system wherein expansion of ion exchange resins during regeneration is minimal but which leaves the resins in an expanded or soft bed state.

Still another object of the present invention is to provide a method wherein the life of the treating material is prolonged and relatively small amounts of regenerating liquid is necessary to regenerate the exhausted treating material and still give a purer liquid than prior art systems.

Still a further object of the present invention is to disclose a method wherein there is improved contact between the regeneration liquid and the exhausted treating material.

It is still another and further object of the present invention to provide and embody a method and system for purifying water and other liquids by providing that the regeneration liquids when regenerating exhausted treating materials have a back pressure of at least 10 psi.

The foregoing objects, and others which will be apparent to those skilled in the art, are all accomplished by the present invention because, in part, of the surprising discovery that a liquid purification system can be made much more efficient if the regeneration solutions or liquids and the rinse solutions all contact the ion-exchange resin when under a pressure of at least 10 psi and preferably at least 30 to 60 psi or higher. The present invention also includes the discovery that exhausted treating material is more efficiently regenerated if the regeneration solution is first used in a dilute solution and the concentration thereof gradually increased until the treating material is substantially and completely regenerated. Additionally, in the present invention the regeneration solution is passed through the treating material in a direction opposite to that which the liquid to be treated flowed.

DESCRIPTION OF THE PREFERRED EMBODIMENT

The present invention can utilize any type of anion exchange resin including both weak base exchange resins and strong base exchange resins, such resins being well known in the art and not forming a part of this invention. It is, however, preferable if the anion exchange resin is in the hydroxyl form, i.e. the easily exchangeable ion is the hydroxyl ion, and can be a copolymer of styrene with divinyl benzene and vinylethyl benzene which has been treated with chloromethyl ether. If silica is a problem in the fluid to be treated, the ion exchange resins must be of the strong base tyoe and in the hydroxyl form. It is particularly preferred in the present invention that a stratified bed be utilized and, in such a stratified bed utilizing anion exchange resins, the weak base resin can be selected from a diverse number of well known resins such as resins known by the trademark Amberlite which are available from Rohm & Haas Company under, for example, the numbers IRA-93, IRA-94 and stratobed IRA-94. The strong base resin can be any conventional resin, for example, Amberlite IRA-402 or stratobed IRA-402.

The cation resin of the present invention must be in the hydrogen form, i.e. the easily exchangeable ion is the hydrogen ion and can be any conventional resin. For example, the cation exchanger may have carboxylic acid groups in the molecule prepared by copolymerizering a mixture of methacrylic acid and divinyl benzene. This type of resin is available under the Amberlite IR-120 (strong acid type). Another type of cation resin useful in the present invention which may be mentioned is a sulfonated, macroreticular styrene-divinylbenzene copolymer which is available under the trademark Amberlite 200.

The adsorbent resins useful in the present invention can be any conventional resin which are well known in the art. Generally speaking, an adsorbent resin will absorb various contaminants in the water which can be removed by regeneration solution. Generally, the adsorbent resin is in the form of insoluble beads and may be polystyrene or an acrylic ester. Such absorbent resins are available from the Rohm & Haas Company under the trademark Amberlite XAD-2, XAD-4, XAD-7, etc.

In the present invention, after the treating resin is exhausted the resin is backwashed or pre-rinsed to cleanse the resin by mechanical action and to reclassify the resin particles by weight and size; the finer particles remaining at the upper part of the bed and the heavier particles at the bottom of the bed. When utilizing an anion exchange resin, where silica removal is important, it is normal to utilize a pre-rinse of heated water to pre-heat the anion resin bed. After backwash and/or pre-rinse the resin is regenerated by introducing a regenerating solution. In ion exchange regeneration the concentrations may vary widely (2 to 10 pounds per cubic foot of resin), the regenerant having been diluted with water although it is normal to utilize the maximum allowable solution which may be as high as 10% or greater. Similarly, the concentration of regeneration solutions will vary widely for adsorbent resins.

After the treating resins, i.e. the ion exchange resins and the adsorbent resins, have been regenerated the treating materials are rinsed, generally with water if that is the liquid to be treated, in order to remove the regeneration liquid.

As noted hereinbefore, the critical aspects of the present invention reside in employment of pressurization during service, regeneration and rinsing as well as utilizing multiple step regeneration and counter flow regeneration. That is, up flow regeneration and down flow service or, in the alternative, down flow regeneration and up flow service. These three critical aspects can be applied to water or any other liquid treating system for deionization, demineralization or adsorbent systems employing any ion exchange resin (providing that the cation exchange resin is in the hydrogen form) or adsorbent resin which are contained in pressure vessels or zones to remove mineral solids, ion silica, colloidal silica, organic matter and other undesirable elements contained in liquids. Additionally, the present invention is useful in removing contaminants which poison ion exchange or adsorbent resins such as iron, phenols, detergents such as ABS, and dissolved gases such as carbon dioxide. Moreover, the up flow reverse cycle also removes small amounts of fine suspended solids or turbidity that are injurious to ion exchange resins or adsorbent resins.

Pressurization, in combination with step wise regeneration, reduces resin expansion and provides full and complete contact of regeneration liquids with ion exchange or adsorbent resin materials and permits full penetration of regenerant to the center of the resin beads as well as allowing for almost complete use of the regeneration liquid.

As noted before, a pressure of at least 10 psi during regeneration and rinsing is absolutely necessary in the present invention and, it is preferable, that a pressure of at least 30 psi be employed and, more preferably, at least as high as 60 psi and higher. Step wise regeneration, as employed in this specification, means that a very dilute solution of regeneration liquid is first utilized and the concentration of the regeneration liquid is gradually increased to, for example, the maximum that can be utilized with the particular resin being regenerated.

In order to utilize the resins it is normal to place them in a container which can be a cylindrical tank, the construction of which is well known in the art, see for example U.S. Pat. Nos. 3,385,787 and 3,642,616. In general, there will be a freeboard space at the top of the tank and the liquid to be treated will enter at the top of the tank, pass through the ion exchange resin or, in the case of a stratified bed, resins, and exit at the bottom of the tank. The high internal back pressure of the tank, which as noted above is critical in the present invention, is normally accomplished by restricting the outlet valve although it can be seen that any means for building up back pressure can be utilized in the present invention.

A typical cylindrical container for a stratified anion bed (or a cation bed) will have a valve and pipe at the top of the tank for conveying influent water into the tank. This same line will operate as a backwash outlet. In general, for such a system, it is normal to have an upper distributor so that the influent liquid to be treated or deionized is evenly distributed over the resin. Additionally, there may be an intermediate collector placed above the resin bed (such as is normally used to introduce regenerants just above the resin bed to prevent dilution with the volume of service cycle influent contained in the freeboard above the resins) to reduce the normal expansion of the resins during the regeneration cycle and prevent loss of resin to the drain. However, it should be noted, that in the present invention there is very little expansion of the resin and therefore there is an even distribution of regeneration liquid as well as full contact with each resin particle for penetration of both regeneration liquid can rinse liquid.

In operation, regeneration liquid will enter at the bottom of the container and pass upward through the resin bed and exit from the upper or intermediate distributor with the outlet valve being regulated to insure or maintain a back pressure of at least 10 psi and, in this example, a back pressure of 30 psi. Generally, better results are obtained the higher the back pressure and I have utilized back pressures as high as 60 psi and greater with very good results. The precise back pressure is dependent upon the type of influent liquid to be treated.

In the presently preferred exemplary embodiment, which is utilized to completely deionize influent water, and exemplifies a stratified anion exchange resin and a cation exchange resin bed, influent water enters the top of the cation exchange resin bed and exits from the bottom of the bed. The thus treated water then enters the top of the anion exchange resin bed and exits from the bottom.

The exchange resin employed are as follows: The cation resin is Amberlite IR-120 (strong acid with 158 cubic feet being utilized); the anion exchange resin is Amberlite IRA-93 (weak base, with 14 cubic feet being utilized) and Amberlite IRA-402 (strong base, with 71 cubic feet being utilized, the total volume of ion exchange resin being 85 cubic feet). The dilution water flow rate for the cation exchange resin regeneration liquid is 51 gallons per minute for the anion exchange regeneration solution is 32 gallons per minute.

After the beds are exhausted the cation bed is regenerated with a sulfuric acid solution and the anion exchange resin bed is regenerated with a sodium hydroxide solution. The chemical regeneration utilizing sulfuric acid and sodium hydroxide is exemplified in the following tables.

TABLE I

ACID REGENERATION

| STEP | PERCENTAGE | TIME MINUTES | GALLONS OF SOLUTION | POUNDS ACID |
|---|---|---|---|---|
| 1 | 1.0% | 33.6 | 1713.6 | 143.77 |
| 2 | 2.0% | 19.2 | 979.2 | 164.30 |
| 3 | 3.5% | 19.2 | 979.2 | 287.54 |
| 4 | 6.0% | 14.4 | 734.4 | 369.69 |

TABLE II

CAUSTIC REGENERATION

| STEP | PERCENTAGE CAUSTIC | TIME MINUTES | GALLONS OF SOLUTION | POUNDS CAUSTIC |
|---|---|---|---|---|
| 1 | 1.5% | 33.6 | 1075.2 | 135 |
| 2 | 2.5% | 31.2 | 998.4 | 210 |
| 3 | 5.0% | 9.6 | 307.2 | 129 |

As can be seen from the foregoing table I, the acid regeneration started with a dilute solution of sulfuric acid and, in four separate steps, the concentration of the acid was gradually raised, starting with a 1% solution and ending with a 6% solution, by weight. During the acid regeneration a back pressure was present of at least 30 psi which, in part, insured that the acid solution penetrated the resin and also prevented expansion of the cation resin bed thereby providing an even distribution of regeneration solution and full contact with each resin particle for penetration of the regeneration acid solution.

It also can be seen from the foregoing table II, that the sodium hydroxide solution was initially a 1.5% solution (by weight) and, in three separate steps, the concentration was gradually raised to 5%. During the entire regeneration the back pressure was approximately 30 psi which, as in the case of the acid regeneration, prevented expansion of the anion resin bed and insured full penetration of the resin solution. This full penetration of the resin solution is shown by the fact that at least 95% of the regenerant liquid was utilized thereby having substantially no waste whereas in a typical prior art system not utilizing pressurization nor step wise increases in concentration it is typical to have only 60% to 80% of the regeneration liquid utilized in regenerating the particular resin.

As is also apparent from the above tables, the amount of regeneration solution, in gallons or pounds per cubic foot of resin, is greater for the second step than the first step. However, it should be noted that the step wise increase in concentration can be so small as to almost a continuous increase during the entire regeneration cycle.

In the step wise regeneration of the cation exchange resin utilizing an acid solution, there must be 2 and preferably at least 3 or more separate steps starting with a concentration of at least 0.5% and ranging upwards to the maximum concentration which the particular cation resin can use. Thus, a typical step wise regeneration of the cation exchange resin will start with the acid solution having a concentration ranging from 0.5% to as high as 10% with the preferred starting concentration ranging from 1% to 3%. After the resin is anywhere from 10% to 20% regenerated the concentration of the acid solution is increased (e.g. 1%) and the intermediate concentrated acid solution passed through the cation exchange resin. The concentration is then increased at least another 1% and, if it is 3 step process, the concentration will generally be the maximum allowed for the particular cation exchange resin utilized. This last concentration of acid is passed through the cation exchange resin until it is completely regenerated.

The caustic or sodium hydroxide regeneration of the anion exchange resin is conducted in at least 2 and preferably at least 3 or more steps. As a general rule, the initial concentration of the aqueous solution of sodium hydroxide will vary from 0.5% to 2% and thereafter the concentration can be raised with the final percentage generally depending upon the maximum solution allowed for the particular anion resin.

In the foregoing embodiment, two beds of anion and cation resins was examplified but the present invention works equally as well with an anion exchange resin, a cation exchange resin, or adsorbent resin.

In actual practice the foregoing embodiment produced 232,206 gallons of water utilizing 965 pounds of sulfuric acid and 474 pounds of sodium hydroxide to regenerate the resins. Using a conventional system (no pressure or step wise regeneration) the amount of acid ncessary for regeneration was 1038 pounds and the amount of sodium hydroxide necessary was 490 pounds with the system yielding only 125,830 gallons of water. Based on the yield of water the present invention had about a 85% increase as compared to a conventional system with about 50% decrease in the use of sulfuric acid and sodium hydroxide per 1000 gallons of treated effluent. Moreover, the quality of water is better, for example, as can be seen from the following table.

TABLE III

| | CONVENTIONAL SYSTEM | INSTANT SYSTEM |
|---|---|---|
| Sodium (ppm) | 5–10 | 0.4–0.6 |
| Total Cations (ppm) | 5–10 | 0.4–0.6 |
| Carbonate (ppm) | 2–5 | 0.1 |
| Chloride (ppm) | 3–5 | 0.2 |
| Total Anions (ppm) | 5–10 | 0.4–0.6 |
| Silica (ppm) | 0.5–1.0 | 0.0–0.1 |
| pH | 8.5 | 8.5–8.8 |
| Conductivity (microhms) | 25–50 | 2–4 |

Comparable results have been obtained utilizing different systems and resins, including adsorbent resins. As noted before, the amount of steps utilized in regenerating vary and can include three steps for the anion resin and four steps for the cation resin.

I claim:

1. A method for purifying water containing dissolved ions utilizing a cation and anion exchange resin which comprises:
   1. passing said water to be purified through a cation zone containing a cation exchange resin in the hydrogen form, and in intimate contact with said cation exchange resin;
   2. removing said water from said cation zone when said water is substantially free of dissolved cations;
   3. passing said water through an anion zone containing an anion exchange resin and in intimate contact with said anion exchange resin;
   4. removing said water from said anion zone when said water is substantially free of anions;
   5. regenerating said cation exchange resin contained in said cation zone when said cation exchange resin is substantially exhausted by passing through said cation zone and in intimate contact with said cation exchange resin a solution containing cation regenerant in a direction opposite to the flow of water having been purified, said cation zone having an internal back pressure of at least 10 pounds per square inch when said solution is in contact with said cation exchange resin, said solution containing cation regenerant being added in increasingly concentrated amount of regenerant, said solution containing cation regenerant being added in at least three different concentrations of regenerant, the initial concentration of regenerant being at least 0.5%, by weight, of regenerant based on the entire weight of the solution;
   6. regenerating said anion exchange resin contained in said anion zone when said anion exchange resin is substantially exhausted by passing through said anion zone and in intimate contact with said anion exchange resin a solution containing anion regenerant in a direction opposite to the flow of water having been purified, said anion zone having an internal back pressure of at least 10 pounds per square inch when said solution containing anion regenerant is in contact with said anion exchange resin, said solution containing anion regenerant being added in increasingly concentrated amounts of regenerant and in at least two different concentrations of regenerant, the initial concentration of regenerant being at least 0.5%, by weight, of regenerant based on the entire weight of the solution;
   7. removing the solution containing cation regenerant from said cation exchange resin when the cation exchange resin is substantially regenerated by passing therethrough a rinse solution of water; and
   8. removing the solution containing anion regenerant from said anion exchange resin when the anion exchange resin is substantially regenerated by passing therethrough a rinse solution of water.

2. A method according to claim 1 wherein the solution containing anion regenerant is an aqueous solution containing sodium hydroxide.

3. A method according to claim 1 wherein the solution containing cation regenerant is an aqueous solution containing an acid.

4. A method according to claim 3 wherein the acid is sulfuric acid.

5. A method according to claim 3 wherein during regeneration the amount of the acid in said solution is increased at least 1%, by weight, based on the entire weight of the solution, each time for at least three times.

6. A method according to claim 5 wherein during regeneration the amount of the acid in said solution is increased at least 1%, by weight, based on the entire weight of the solution, each time for at least five times.

7. A method according to claim 1 wherein said internal back pressure is at least 30 pounds per square inch.

8. In a method for purifying water containing dissolved anions by passing said water to be purified through a zone containing anion exchange resin and in intimate contact with said anion exchange resin thereby removing dissolved anions from said water, regenerating said anion exchange resin when exhausted by passing a solution containing a regenerant for said anion exchange resin through said zone and in intimate contact with said anion exchange resin, and removing said solution containing regenerant from anion exchange resin by passing through said zone and in intimate contact with said anion exchange resin a rinse solution, the improvement comprising;

regenerating said anion exchange resin when said resin is exhausted by passing a solution containing a regenerant for said anion exchange resin through said zone and in intimate contact with said resin in a direction opposite to the direction which the water to be purified passed through said zone and said resin, said zone having an internal back pressure of at least 10 pounds per square inch when said solution is in said zone and in contact with said anion exchange resin, said solution containing regenerant being added in increasingly concentrated amounts of regenerant and in at least two different concentrations, the initial concentration being at least 0.5%, by weight, of regenerant based on the total weight of said solution.

9. In a method according to claim 8 wherein the solution containing regenerant is an aqueous solution containing sodium hydroxide.

10. In a method according to claim 9 wherein the amount of said sodium hydroxide in said aqueous solution is increased at least 0.5%, by weight, based on the entire weight of the solution, for at least three times.

11. In a method for purifying water containing dissolved cations by passing said water to be purified through a zone containing a cation exchange resin and in intimate contact with said cation exchange resin thereby removing dissolved cations from said water, regenerating said cation exchange resin when exhausted by passing a solution containing regenerant for said cation exchange resin through said zone and in intimate contact with said cation exchange resin, and removing said solution containing regenerant from said cation exchange resin by passing through said zone and in intimate contact with said exchange resin a rinse solution, the improvement comprising;

regenerating said cation exchange resin when said rinse is exhausted by passing a solution containing a regenerant for said resin through said zone and in intimate contact with said resin in a direction opposite to the direction which the water to be purified passed through said zone and said resin, said zone having an internal back pressure of at least 10 pounds per square inch when said solution is in contact with said cation exchange resin, said solution contaning regenerant being added in increasingly concentrated amounts of regenerant and in at least three different concentrations of regenerant, the initial concentration of regenerant being at least 0.5%, by weight, of regenerant based on the entire weight of the solution.

12. In a method according to claim 11 wherein the solution containing regenerant is an aqueous solution containing sulfuric acid.

13. In a method according to claim 12 wherein the amount of sulfuric acid in said aqueous solution is increased at least 1%, by weight, based on the entire weight of the solution each time for at least three times.

* * * * *